No. 759,381. PATENTED MAY 10, 1904.
S. E. KIEROLF.
PEA PICKING MACHINE.
APPLICATION FILED MAY 26, 1903.
NO MODEL.

Witnesses:
Jas. E. Hutchinson
E. L. Corbett

Inventor:
S. E. Kierolf,
By Edson Bros,
Atty's.

No. 759,381.

Patented May 10, 1904.

UNITED STATES PATENT OFFICE.

SALEM E. KIEROLF, OF JACKSON, TENNESSEE.

PEA-PICKING MACHINE.

SPECIFICATION forming part of Letters Patent No. 759,381, dated May 10, 1904.

Application filed May 26, 1903. Serial No. 158,855. (No model.)

*To all whom it may concern:*

Be it known that I, SALEM E. KIEROLF, a citizen of the United States, residing at Jackson, in the county of Madison and State of Tennessee, have invented certain new and useful Improvements in Pea-Picking Machines; and I do hereby declare the following to be a full, clear, and exact description of the invention, such as will enable others skilled in the art to which it appertains to make and use the same.

My invention relates to certain improvements in what are termed "pea-picking machines or harvesters," it also being equally adapted to clover-blossom harvesters and for like purposes. It is more especially adapted for use in connection with a machine which forms the subject-matter of Letters Patent granted to me February 4, 1902, No. 692,456, and has for its object more particularly to render more effective the action of the picking or flailing cylinder and to simplify and cheapen the construction of said cylinder.

Said invention consists of such a cylinder produced in sections and in such a manner that it will have the requisite yielding or elastic action upon the vines in removing the pea-pods therefrom, and yet be of sufficient rigidity to effectively act upon the vines, as in depressing or feeding them to the machine in effecting such removal of the pea-pods, also to provide for forming a shaft for supporting said cylinder, so as to obviate the passing of said shaft therethrough, as heretofore in suspending the same in position, and in certain other details of construction and arrangement of the parts, substantially as hereinafter more fully disclosed, and specifically pointed out by the claims.

Figure 1:
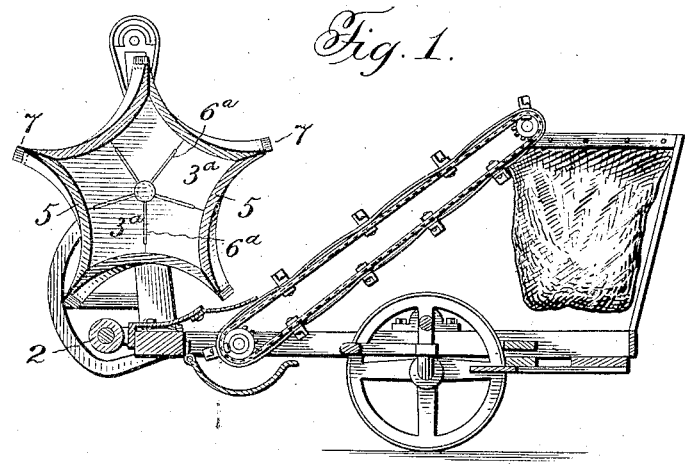
Figure 2:
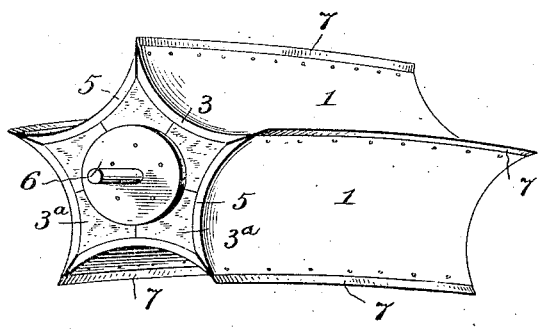
Figures 3, 4:
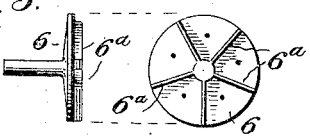
Figure 5:

In the accompanying drawings, illustrating the preferred embodiment of my invention, Figure 1 is a view showing said invention applied for use in connection with the machine above referred to. Fig. 2 is a perspective view thereof, and Figs. 3, 4, and 5 are detailed views thereof.

It will be understood that latitude is allowed herein as to details, as they may be changed as circumstances suggest without departing from the spirit of my invention and the same yet be intact and be protected.

In carrying out my invention I provide a "cylinder" 1, which is suitably supported in position for operation, as shown in Fig. 1, as in my patent above referred to, said cylinder being arranged in a plane above the roll 2, and by the combined action of which cylinder and roll, both revolving forwardly, the vines containing the pea-pods as the machine moves forwardly will be fed between said cylinder and roll and said pea-pods detached from the vines and suitably disposed of, as described in said patent. Said cylinder is principally produced of heads 3, each comprising wooden sections $3^a$, a series of concavo-convex plates 5, and shaft-sections 6, having radial ribs $6^a$, between which are inserted said wooden sections, said head-sections accordingly conforming to the approximately quadrant-shaped spaces between said ribs. Between the longitudinal meeting edges of said concavo-convex plates are inserted, preferably, pieces of leather or other flexible material 7, to provide for exerting a yielding or elastic action upon the pea-pods as the cylinder revolves in detaching said pods from the vines, and thus prevent the crushing or destruction of the vines of the peas, as would otherwise be the case. Also it will be observed that by this arrangement and construction of shaft-sections, which also serves to effect the holding of the component parts of the cylinder together, is obviated the use of a continuous shaft extending longitudinally through the cylinder, as heretofore, and whereby the cylinder possesses a limited amount of flexibility, as desirable in the use of such a cylinder, while lessening expense and simplifying construction.

Having thus described my invention, what I claim as new, and desire to secure by Letters Patent, is—

1. A flailing-cylinder comprising a series of longitudinal concavo-convex plates having arranged between their meeting longitudinal edges yielding pieces of material and heads comprising sections to which said plates are secured.

2. A flailing-cylinder comprising heads each having a series of sections, and shaft-sections provided with ribs between which are inserted said head-sections, and means for securing said shaft-sections.

3. A flailing-cylinder comprising heads produced of wooden sections suitably secured together and longitudinal concavo-convex plates secured to said wooden sections, said plates having arranged between their meeting longitudinal edges flexible pieces of material.

4. A flailing-cylinder consisting of longitudinal plates having effective edges, heads consisting of series of sections, plates secured to said sections and shaft-sections having ribs between which are received said head-sections.

5. A flailing-cylinder consisting of a series of concavo-convex plates, flexible or leather strips secured between the longitudinal edges of said plates, heads comprising wooden sections to which said plates are secured, end plates secured to said sections, and shaft-sections having radial ribs between which are received said head-sections.

In testimony whereof I affix my signature in presence of two witnesses.

SALEM E. KIEROLF.

Witnesses:
W. D. KIEROLF,
T. H. HORTMUS.